United States Patent [19]

Troke

[11] Patent Number: 4,946,121
[45] Date of Patent: Aug. 7, 1990

[54] COMPUTER KEYBOARD HOLDER

[76] Inventor: Jamie T. Troke, 112 Humewood Drive, Belleville, Ontario K8N 4E7, Canada

[21] Appl. No.: 382,196

[22] Filed: Jul. 20, 1989

[30] Foreign Application Priority Data

Jul. 21, 1988 [CA] Canada .................................. 572,776

[51] Int. Cl.$^5$ ........................................... F16M 11/00
[52] U.S. Cl. ..................... 248/201; 211/26; 248/205.3; 248/316.8; 248/918
[58] Field of Search ............... 248/461, 917, 918, 201, 248/205.3, 442.2, 316.8, 676, 670, 678, 675, 924, 639, 637, 694; 211/13, 26; 182/113; 400/682, 717, 718, 691

[56] References Cited

U.S. PATENT DOCUMENTS

| | | | |
|---|---|---|---|
| 980,532 | 1/1911 | Johnson | 182/113 X |
| 2,332,477 | 10/1943 | Thornley | 182/113 X |
| 3,478,996 | 11/1969 | Gunn | 248/461 X |
| 4,619,429 | 10/1986 | Mazza | 248/442.2 X |
| 4,666,113 | 5/1987 | Kettelkamp Sr. et al. | 182/113 X |
| 4,704,604 | 11/1987 | Fuhs | 248/918 X |

FOREIGN PATENT DOCUMENTS

599525  3/1948  United Kingdom ................ 248/214

OTHER PUBLICATIONS

PC Side-Car, Global Computer Supplies, Plainview, NY, Jan. 1987, catalogue 71A, Front cover.

*Primary Examiner*—David L. Talbott
*Attorney, Agent, or Firm*—McFadden, Fincham, Marcus & Allen

[57] ABSTRACT

A bracket accessory for mounting on a computer terminal for temporary storage of a keyboard. A pair of brackets, each bracket having a pair of fingers which define a bight is mounted on a computer terminal so that the bights are located above the terminal and open upwardly and are aligned horizontally. In use, a pair of brackets receive and secure a computer keyboard for termporary storage above the terminal, thus freeing desktop space otherwise occupied by the keyboard.

8 Claims, 2 Drawing Sheets

COMPUTER KEYBOARD HOLDER

FIELD OF THE INVENTION

This invention relates to accessories for computers, computer terminals and word processors. More particularly, this invention relates to mounting bracket accessories used for the temporary storage of a keyboard.

BACKGROUND OF THE INVENTION

Keyboards are widely used in association with computer terminals and micro-computers. A very popular keyboard is the free-standing type, generally secured by a flexible cord to other hardware. The electrical connection frequently comprises an extensible coiled cord.

A major disadvantage of locating a computer terminal and keyboard in a multi-purpose workspace is the space requirement. In particular, the computer hardware, particularly the keyboard, occupies premium desktop space, even when not in use.

This situation, in combination with the generally lightweight nature and unfixed position of such keyboards, sometimes results in their misuse or abuse. For example, a worker wishing to use the desktop space occupied by the keyboard may place the keyboard on its side on the floor, propped against a side of the desk. This creates a generally undesirable situation because of increased risk of damage to a keyboard being temporarily stored on a floor.

One approach to solving this problem has been to provide dedicated workspace, for sole occupation by computer hardware. The additional furniture thus required generally increases the floorspace required for a workspace. This is undesirable in office situations in which office rent is a function of floorspace.

Another type of solution to the problem of space occupied by idle equipment has been the modification of office furniture in which such computer hardware is to be used. For example, ancillary sideboards or desk run-offs which can accommodate keyboards are commercially available. Certain such sideboards are dedicated to keyboard use, and may be movable, so that it and the keyboard can be moved out of the way of the worker when the keyboard is not needed for use. One such type is akin to the old fashioned retractable typewriter desk, having the sideboard attached with a levered mechanism to a desk whereby the sideboard and keyboard can be swung into a stowed position beneath the desktop. This type of approach suffers from several disadvantages: it being generally expensive to buy and install such sideboards, much office furniture is not amenable to retrofitting, requiring replacement with more suitable or adaptable furniture.

SUMMARY OF THE INVENTION

The present invention provides a convenient and inexpensive system for freeing workspace otherwise occupied by a keyboard.

The present invention provides means for adapting a common computer terminal to permit supporting of a keyboard thereabove. For the purposes of this invention "computer terminal" is used to describe a micro-computer comprising a video display screen and a separate box containing computer hardware such as a central processing unit (CPU) and disk drive, a micro-computer comprising a video display screen in which the CPU and disk drive are built into a single unit, or a "dumb" terminal in which the video display screen is one of multiple screens electrically connected to a shared CPU.

Certain embodiments of the invention provide a holder comprising a pair of support members, readily attachable to commonly used monitor screens comprising commercially available computer cathode ray tubes, (CRT's), to permit out-of-use storage of the keyboard in a position above the CRT.

The invention provides a pair of supporting arm members each having a pair of mutually spaced fingers which define a bight. The bights of respective members can be readily aligned and oriented to open upwardly, in installed relation, so as to receive and secure an edge portion of a keyboard (in a substantially horizontal orientation) so that the keyboard is supported by the members.

One embodiment of the invention comprises a pair of arms, made of suitably rigid plastic, which may be attached to the sides of the case of a video display terminal (VDT). Each arm has the bight portion thereof installed uppermost. When installed for use on the VDT, having the bights of the holders in mutually aligned, spaced relation a keyboard, when not desired for use in the workspace, may be placed by an operator into the bights and thereby supported by the arms.

A particular embodiment of the invention provides arms which are attached to a VDT using double-faced pressure sensitive adhesive tape. In such an embodiment the arms have substantially planar surface portions which conform with the flat surfaces of a VDT and provide adequate surface area to ensure secure bonding contact of an arm to the side of the VDT case, by way of the adhesive tape.

In certain embodiments other means for attaching the arms to a CRT may be provided. Glue may be used to provide a more permanent attachment of the arms. Holes may be provided in the arms in order that small screws may be tapped into the screen casing sides to secure each arm in place. Alternatively, securement means such as matched Velcro TM πpads of hook and loop construction may be used to secure an arm in place on a VDT case.

In certain embodiments visual guide means is provided on a holder pair of arms in order to aid aligned installation.

The preferred embodiment provides a holder comprising two arms, each of which is of unitary construction.

It is contemplated that each arm may further comprise a laterally extending flange, which when the arm is installed on a TV set horizontally extends to abut the top of the set, thereby providing additional vertical load transfer support to the holder, and keyboard.

One embodiment of the invention is a kit comprising a pair of arms, and double-faced tape to be used in securing the arms to a VDT.

It is contemplated that a pair of brackets may be provided having a joining bridge therebetween dimensioned to fit a particular video screen, the bridge extending laterally between the two holder arms, and may include an adherent horizontal underside surface to provide attachment to the top of the video screen casing.

It is contemplated that the brackets may be hinged. In one such contemplation a lower portion of each bracket is secured to a VDT side, each having an upper portion hingedly secured thereto so as to swing inwardly and lie flat on the VDT upper side, in a first position when not in use. In a second, extended position the upper arm portions have the bights thereof aligned, which permits a keyboard to be inserted in supported relation therewithin. Such hinged arms may be provided with a releaseable locking mechanism which mutually locks the upper and lower counterparts in the second position. However, the presence of the inserted keyboard usually suffices to stabilize the components of the combination.

An alternative contemplation provides two telescopic arms, each having an upper and a lower portion in longitudinal mutually sliding relation. Each upper arm has a pair of fingers which define the bight by which a keyboard is secured. When in use, each upper arm of a pair of installed arms is slidingly extended, with the bights aligned to receive the keyboard for temporary storage. Each upper arm may be provided with a catch or releaseable abutment means or the like, which can abut a lower flanged surface of such an upwardly extended arm part to secure the upper arm portion in relation to the lower portion. When a holder is not in use, the upper arm may be released to telescope downwardly into a stowed, non-use position. In this way, the upper arms, when not in use, may be repositioned so as not to be exposed as when in an extended position.

One contemplated embodiment provides a pair of brackets shaped to match and fit onto the corner defined by the top and one side of a box case of a microcomputer. Such a box case is provided with certain micro-computers and contains the CPU and one or more disk drives. In one such embodiment, bights of installed brackets are horizontally aligned and open upward in such a way that the longitudinal edges of a keyboard placed therein are generally parallel to the side of the box case to which the brackets are attached. The video display screen of such a micro-computer generally sits on the box case when the computer is in use, and may have to be moved away from the installed bracket in order for the keyboard to be placed into the bights of the brackets.

The invention thus provides a holder for use with an existing keyboard and computer terminal. The holder comprises at least two arms to receive a keyboard in supported, substantially secured relation. Two pairs of fingers define a bight in each arm. Attachment means for each arm for securement thereof to the computer terminal case is provided so that each arm may be attached to the terminal case, to provide mutually aligned, opposed and upwardly open bights. A keyboard can thus be inserted in oriented supported relation within the bights.

In drawings which illustrate embodiments of the invention:

DETAILED DESCRIPTION OF A PREFERRED EMBODIMENT

Figure 2:
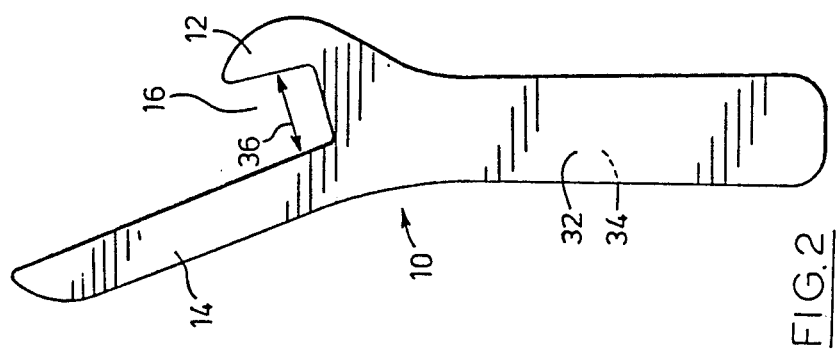
FIG. 2 is a side elevation view of a holder arm of the first preferred embodiment.
Figure 1:
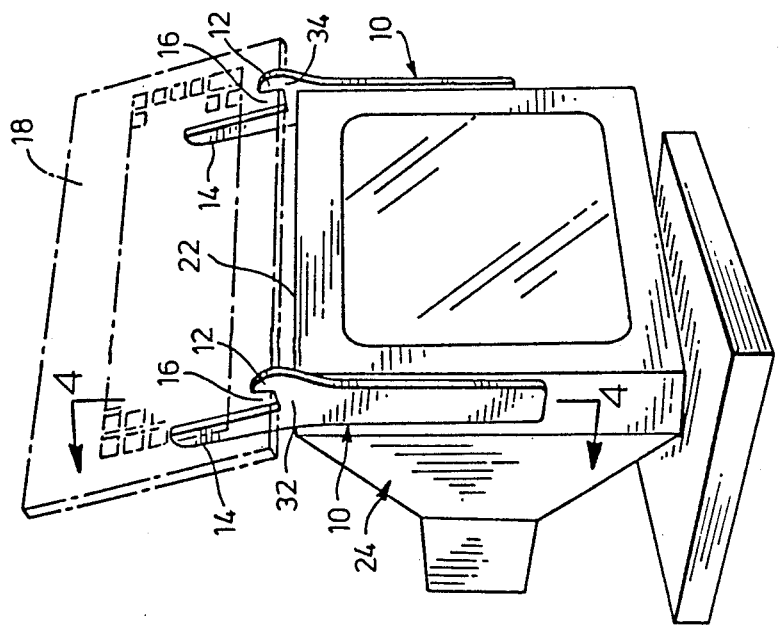
FIG. 1 is a front perspective view of a first preferred embodiment of the invention attached to a VDT, in use with a keyboard.
Figure 4:
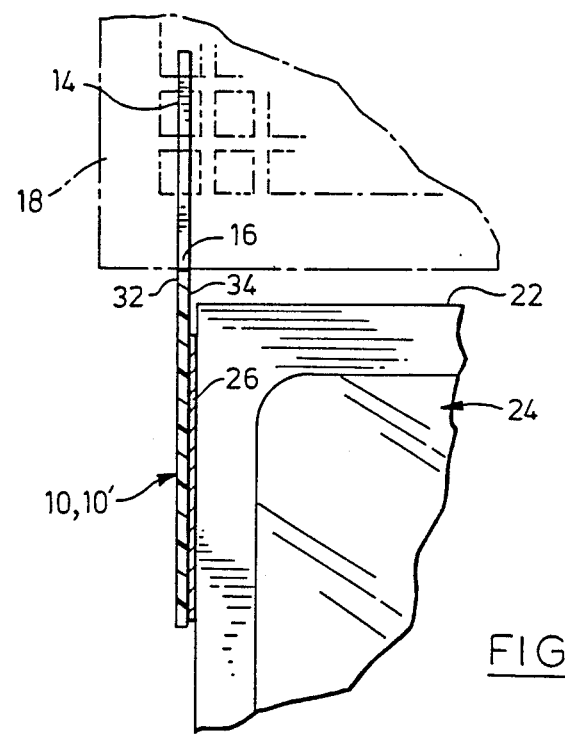
FIG. 4 is a partial cut-away view taken along 4—4 of FIG. 1.

In FIGS. 1 and 2 can be seen an arm 10 of a first preferred embodiment. Two arms 10 comprise a holder. The arm 10 has a shorter forward finger 12 and an extended rearward finger 14 forming a bight 16 of substantially rectangular cross-section into which may be placed a keyboard 18. When a holder comprising two arms 10 is installed, the bights 16 of arms 10 are upwardly open and aligned in a horizontal fashion above the topside 22 of the monitor 24 so that the keyboard 18 may be supported horizontally within a pair of bights 16 as seen in FIG. 1. The holder and monitor 24 are attached with double-sided adhesive tape 26 located between their mutually abutting sides as illustrated in FIG. 4.

Figure 3:
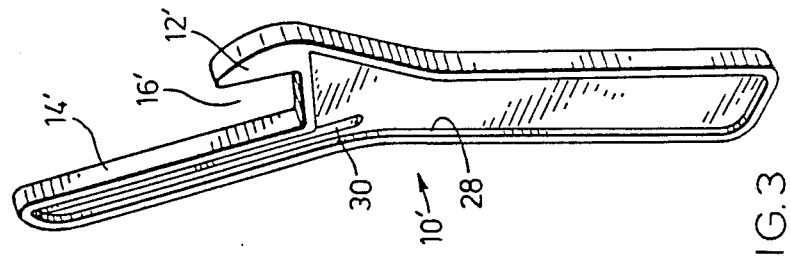
FIG. 3 is a perspective of a holder arm of a second preferred embodiment.

Arm 10' of a second preferred embodiment of the holder of the invention is shown in FIG. 3. The outer dimensions of arm 10 and arm 10' are substantially identical, but arm 10' has hollow portion 28 and rib 30 which substantially extends the length of rearward finger 14'. Arm 10 has substantially flat faces 32 and 34. Each arm 10' has one substantially flat face (not shown) opposite the face having hollow portion 28. When installed, the flat face of arm 10' abuts monitor 24 as does face 34 of arm 10 as shown in FIG. 1.

In FIG. 1, the front longitudinal edge of the keyboard 18 rests within bights 16. It can be readily appreciated that keyboards of various thicknesses can be accommodated in a given pair of arms. The range of thicknesses of keyboards which may be accommodated can be increased by increasing the width 36 of the bight 16 as shown in FIG. 2.

It has been found in the embodiments illustrated that having the forwardly extending finger 12 (12') about one-third the height of rearwardly extending finger 14 (14') where the height of rearwardly extending finger 14 (14') is about one-half the width of a typical keyboard provides satisfactory support for a keyboard therein.

It will of course be understood that the present invention has been described above purely by way of example, and modifications of detail can be made within the scope of the invention as defined in the appended claims.

What is claimed is:

1. A holder for supporting a keyboard on a computer monitor, comprising;
    two elongate body members having upper and lower ends;
    means for attaching each body member to side surfaces of said monitor, with said upper ends extending above a top surface of the monitor;
    each said upper end comprising a pair of fingers, a front finger and a rear finger, each pair of fingers defining a bight therebetween for reception of said keyboard;
    the fingers being inclined upwardly and rearwardly relative to a longitudinal axis of a main part of each body member, said bights being inclined upwardly and rearwardly, the rear finger of each pair extending a distance a number of times longer than the front finger of each pair.

2. The holder as set forth in claim 1, wherein said main parts of each body member have surfaces which substantially conform with side surfaces of the computer monitor case.

3. The holder as set forth in claim 2 for use with a video display screen wherein said means for attaching each body member comprises double-faced adhesive tape.

4. The holder as set forth in claim 1 wherein each arm and the related fingers are of unitary construction.

5. The holder as set forth in claim 1 where said rear finger is approximately three times the length of the front finger an body member.

6. The holder as set forth in claim 1 in combination with a computer terminal.

7. The holder as set forth in claim 6, the combination further comprising the keyboard.

8. The holder as set forth in claim 7, wherein the computer terminal is a micro-computer.

* * * * *